United States Patent [19]

Boutmy et al.

[11] 4,074,074

[45] Feb. 14, 1978

[54] TIME DIVISION DIGITAL TRANSMISSION SYSTEM

[75] Inventors: Patrick E. Boutmy; Jean G. Walraet, both of Lannion, France

[73] Assignee: Societe Anonyme de Telecommunications, Paris Cedex, France

[21] Appl. No.: 788,040

[22] Filed: Apr. 15, 1977

[30] Foreign Application Priority Data

Apr. 23, 1976  France ............................. 76 12129

[51] Int. Cl.² ............................................. H04J 3/04
[52] U.S. Cl. .......................... 179/15 BW; 179/15 A; 179/15 AF; 179/15 AP
[58] Field of Search ........ 179/15 BW, 15 AF, 15 BS, 179/15 BM, 15 AC, 15 AV, 15 BA, 15.55 T, 15 AP, 15 A; 178/22, 50, 68; 325/38 A, 141, 321

[56] References Cited

U.S. PATENT DOCUMENTS

| | | | |
|---|---|---|---|
| 3,492,432 | 1/1970 | Schimpf | 179/15 AP |
| 3,569,631 | 3/1971 | Johannes | 179/15 AF |
| 3,611,141 | 10/1971 | Waters | 325/41 |
| 3,689,699 | 9/1972 | Brenig | 179/15 BS |

*Primary Examiner*—David L. Stewart

[57] ABSTRACT

In a time-division digital transmission system comprising transmitting and receiving stations interconnected by transmission lines, a number of component digital channels having a low flow rate are multiplexed into a single resultant channel having a high flow rate. The code used in the stations is a binary code and the code used in the lines is a multi-level code such that a number N of bits in the binary code corresponds to a smaller number N' of digits of the multi-level code. Consequently, a predetermined flow rate in the stations corresponds to a smaller flow rate in the lines, equal to N'/N times the flow rate in the stations. The system comprises, in the transmitting part of a station, means for placing in parallel the bits of a number of component channels equal to a multiple k of N, at the rate of one bit per component channel, so as to form parallel words of kN bits, means for multiplexing the bits of the parallel kN-bit words into k parallel words of Nbits, and means for converting the parallel N-bit words from said binary code into parallel words of N' digits in said multi-level code. In the receiving part of a station, the system comprises means for distributing the bits of the parallel words of kN bits at the rate of one bit on each of the kN component channels, means for converting the parallel N'-digit words into parallel N-bit words of said binary code, means for forming parallel words of kN bits out of a number k of N-bit words supplied by the latter said converting means and means for demultiplexing the parallel kN-bit words into kN bits at the rate of one bit per component channel.

7 Claims, 4 Drawing Figures

TIME DIVISION DIGITAL TRANSMISSION SYSTEM

CROSS REFERENCES TO RELATED APPLICATIONS

Applicants hereby make cross references to their French Patent Application PV 76 12129, filed Apr. 23, 1976 and claim priority thereunder following the provisions of 35 U.S.C. 119.

BACKGROUND OF THE INVENTION

1. Field of the Invention

The invention relates to a time-division digital transmission system of the kind in which a number of component digital channels each having a predetermined flow rate are multiplexed in time to form a single channel adapted to a transmission line.

2. Description of the Prior Art

Systems of this kind are known in the prior art; for instance, the U.S. Pat. No. 3,987,248 filed Nov. 25, 1974 describes a system of the kind which converts 16 incoming component channels transmitting plesiochronic digital signals at the rate of 8.448 Mbits/s into an outgoing channel at 140 Mbits/s and, in the reversed direction, converts an incoming channel at 140 Mbits/s into 16 outgoing channels at 8 Mbits/s. On each incoming channel, the prior-art system comprises an input junctor, that is a circuit which performs a number of functions: i.e. conversion of the code used on the line into the binary code used in the equipment devices, re-shaping of the line signals and restitution of a rate signal. The input junctors are connected by input junctions to store and stuffing circuits, which are connected to a multiplexer. The resulting 140 Mbits/s signal coming from the multiplexer is not suitable for transmission along the line. In the prior art, it is transmitted via an output junction to an output junctor. The output junctor serve the same purpose as the input junctors but operate in the reversed direction, i.e. they effect conversion of the binary code used in the equipment devices into the code used on the line, re-shaping of the signals and restitution of the rate.

In practice, various line codes may be used, such as the bipolar code, the HDBn code and the 4B3T and 4S43 codes. As is known, the bipolar code is a three-level code in which the binary 1 is alternately represented by $+1$ and $-1$. The HDBn code is derived from the bipolar code but modified so that no sequence containing more than a number $n$ of zero signal elements can exist. Accordingly, each sequence of $(n+1)$ zeros is represented by a sequence B O ... O V or O O ... O V where B is a 1 which respects bipolarity and V is a 1 which violates bipolarity.

In the 4B3T code, each of the 16 four-bit binary words corresponds to one or the other of two ternary words, depending on whether the numerical sum or cumulative disparity of the ternary signals is positive of negative, when measured at the end of the last converted word. The 4B3T code has six ternary words with zero disparity, ten ternary words of positive disparity and then ternary words of negative disparity. Thus, six of the sixteen binary words can be represented by a ternary word of zero disparity and the remaining ten binary words can be represented by ternary words having a positive or negative disparity depending whether the cumulative disparity is itself negative or positive. More specifically, there are two ternary code alphabets, the first alphabet containing all the zero disparity words and all the positive disparity words, whereas the second alphabet, in the same positions, contains the zero disparity words and the negative disparity words which, in the same positions, are the inverses of the positive disparity words. The cumulative disparity can take eight states numbered from 0 to 7, but varies only from 1 to 6 at the end of every ternary word. The first alphabet is used for conversion when the cumulative disparity is equal to 1, 2, or 3 and the second alphabet when the cumulative disparity is equal to 4, 5 or 6.

The following table I shows the two alphabets of the 4B 3T code:

TABLE I

| Binary | First alphabet | Disparity | Second alphabet | Disparity |
|---|---|---|---|---|
| 0 0 0 0 | 0 − + | 0 | 0 − + | 0 |
| 0 0 0 1 | − + 0 | 0 | − + 0 | 0 |
| 0 0 1 0 | − 0 + | 0 | − 0 + | 0 |
| 0 0 1 1 | + − + | + 1 | − + − | − 1 |
| 0 1 0 0 | 0 + + | + 2 | 0 − − | − 2 |
| 0 1 0 1 | 0 + 0 | + 1 | 0 − 0 | − 1 |
| 0 1 1 0 | 0 0 + | + 1 | 0 0 − | − 1 |
| 0 1 1 1 | − + + | + 1 | + − − | − 1 |
| 1 0 0 0 | 0 + − | 0 | 0 + − | 0 |
| 1 0 0 1 | + − 0 | 0 | + − 0 | 0 |
| 1 0 1 0 | + 0 − | 0 | + 0 − | 0 |
| 1 0 1 1 | + 0 0 | + 1 | − 0 0 | − 1 |
| 1 1 0 0 | + 0 + | + 2 | − 0 − | − 2 |
| 1 1 0 1 | + + 0 | + 2 | − − 0 | − 2 |
| 1 1 1 0 | + + − | + 1 | − − + | − 1 |
| 1 1 1 1 | + + + | + 3 | − − − | − 3 |

In the MS43 code, each of the sixteen four-bit binary words corresponds to one of the three ternary words. Six of the sixteen binary words are always represented by the same six ternary words having zero disparity, and the remaining ten binary words are represented by the same ternary word having non-zero disparity and the same sign in two of the alphabets, or into a ternary word in the third alphabet having a different non-zero disparity but the opposite sign. The cumulative disparity can take six states numbered from 0 to 5, but varies only between 1 and 4 at the end of every ternary word. The first, second or third alphabet is chosen, depending on whether the cumulative disparity is equal to 1, 2, 3 or 4.

The following table II shows the three alphabets in the MS43 code:

TABLE II

| Binary | First alphabet | Disparity | Second alphabet | Disparity | Third alphabet | Disparity |
|---|---|---|---|---|---|---|
| 0 0 0 0 | + + + | + 3 | − + − | − 1 | − + − | − 1 |
| 0 0 0 1 | + + 0 | + 2 | 0 0 − | − 1 | 0 0 − | − 1 |
| 0 0 1 0 | + 0 + | + 2 | 0 − 0 | − 1 | 0 − 0 | − 1 |
| 0 0 1 1 | 0 − + | 0 | 0 − + | 0 | 0 − + | 0 |
| 0 1 0 0 | 0 + + | + 2 | − 0 0 | − 1 | − 0 0 | − 1 |
| 0 1 0 1 | − 0 + | 0 | − 0 + | 0 | − 0 + | 0 |
| 0 1 1 0 | − + 0 | 0 | − + 0 | 0 | − + 0 | 0 |
| 0 1 1 1 | − + + | + 1 | − + + | + 1 | − − − + | − 1 |
| 1 0 0 0 | + − + | + 1 | + − + | + 1 | − − − | − 3 |
| 1 0 0 1 | 0 0 + | + 1 | 0 0 + | + 1 | − − 0 | − 2 |
| 1 0 1 0 | 0 + 0 | + 1 | 0 + 0 | + 1 | − 0 − | − 1 |
| 1 0 1 1 | 0 + − | 0 | 0 + − | 0 | 0 + − | 0 |
| 1 1 0 0 | + 0 0 | + 1 | + 0 0 | + 1 | 0 − − | − 1 |
| 1 1 0 1 | + 0 − | 0 | + 0 − | 0 | + 0 − | 0 |
| 1 1 1 0 | + − 0 | 0 | + − 0 | 0 | + − 0 | 0 |
| 1 1 1 1 | + + − | + 1 | + − − | − 1 | + − − | − 1 |

The bipolar code and the HDBn code have the same flow rate as the binary code, but the 4B3T code and its variant, the MS43 code, in which four-bit binary words correspond to words having three ternary digits, result in a decrease in the flow rate in line code compared with the flow rate in the transmission and reception equipment. The flow rate in line code is ¾ of the flow rate in the equipment. According to the invention, code 4B3T or MS43 is used as the line code and, as will be explained hereinafter, advantage is taken of the reduction in the line flow rate obtained by means of these codes.

It is clear from the preceding summary of the prior art that the transmitting and receiving equipments in multiplex transmission systems are connected to the transmission line by input and output junctors which, among other functions, "transcode" (i.e. convert the code of) information from the binary code into the line code and vice versa. The transcoding, in the case of code 4B3T or MS43, is via parallel four-bit words when transcoding the binary code into the line code, and via parallel ternary three-digit words when transcoding from the line code into the binary code. In the prior-art systems, the bits are sent in "series" from the multiplexer to the transcoder via the output junction, or from the transcoder to the demultiplexer via the input junction. If the HDBn code is used as the line code, transcoding occurs in series; if code 4B3T or code MS43 is used as the line code, the transcoder brings about series-parallel conversion followed by transcoding proper, itself followed by parallel-series conversion.

SUMMARY OF THE INVENTION

Accordingly, an object of this invention is to provide a time-division digital transmission system in which the output multiplexers and transcoders on the one hand and the input demultiplexers and transcoders on the other hand, are combined into a simplified composite equipment such that the series signal leaving the multiplexer and the series signal entering the demultiplexer do not actually appear but are replaced by signals capable of being directly transcoded.

More specifically, with reference to the example described in detail hereinafter and relating to the multiplexing of sixteen component 2.048 Mbits/s channels into an outgoing 34 Mbits/s channel, the 34 Mbits/s series signal is not produced by the multiplexer; on the contrary, the multiplexer produces parallel 4-bit words, which are directly applied to the transcoder at the flow rate of 8 MHz. As will be shown, all the time-base signals necessary for multiplexing and code conversion are derived from a clock having the line flow rate of 24 MHz and not the equipment flow rate of 34 MHz.

BRIEF DESCRIPTION OF THE DRAWING

Other objects and advantages of this invention will become apparent from the following detailed description together with the accompanying drawings in which.

DESCRIPTION OF THE PREFERRED EMBODIMENT

The prior art will be summarized and the invention described with reference to the same example, in which sixteen 2.048 Mbits/s digital channels are multiplexed and demultiplexed into one 34 Mbits/s digital channel and vice versa, and in which there is "equipment code-line code" conversion from the binary code into 4B3T code. As is known, the frame of the 34 Mbits/s digital signal comprises 1536 bits divided into four sectors of 384 bits, the frame-locking word is at the head of the first sector, the stuffing indication bits are at the head of the second, third and fourth sectors and the stuffing bits, if any, follow the stuffing indication bits of the fourth sector.

Figure 1:
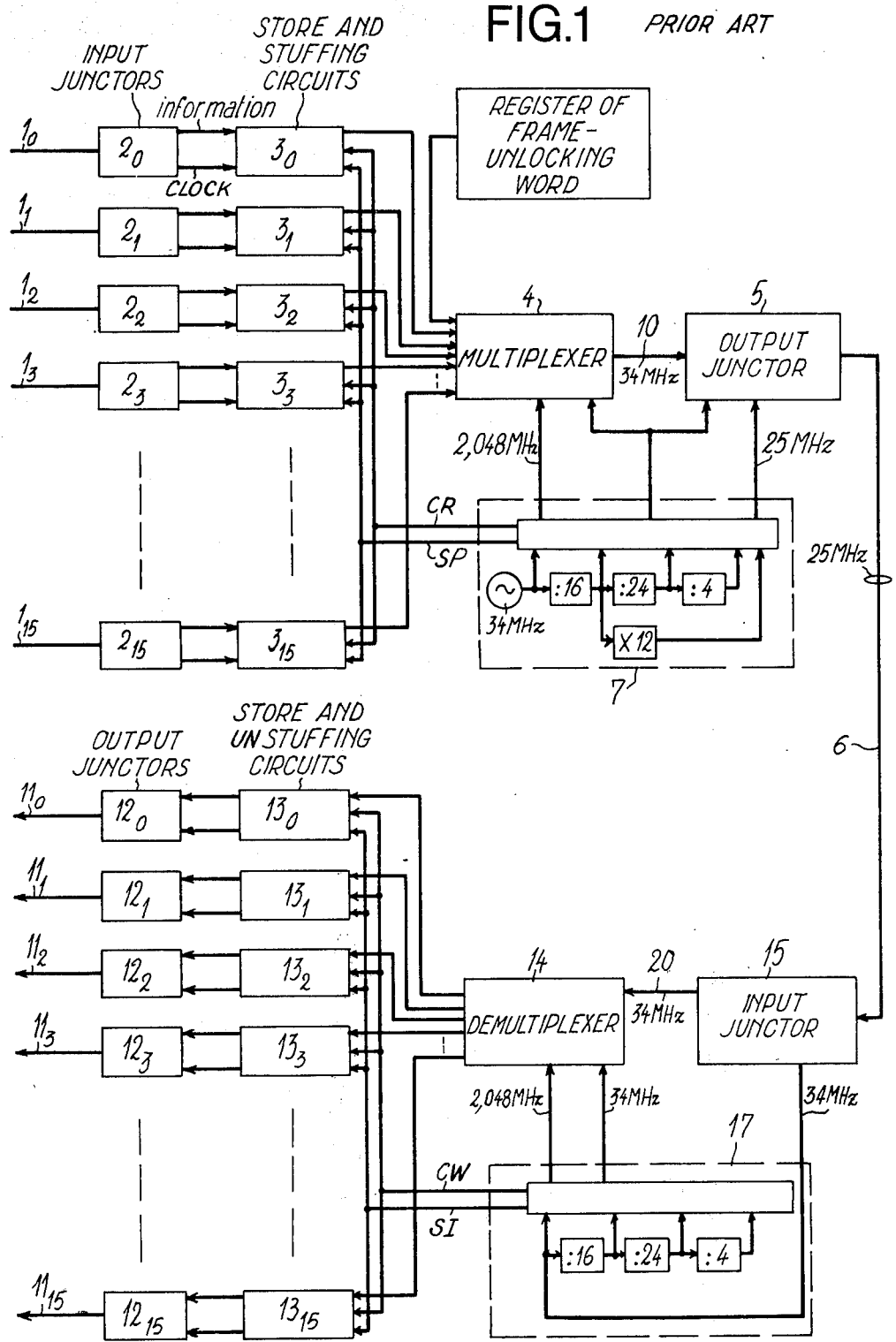
FIG. 1 is a block diagram of the electronic circuit of a prior-art time-division digital transmission system.

FIG. 1 shows a prior-art digital transmission system having two stations A and B. In station A, sixteen digital channels $1_0$ to $1_{15}$ incoming at the flow rate of 2.048 Mbits/s are connected to input junctors $2_0$ to $2_{15}$ used for shaping, retiming and code conversion or transcoding. The input junctors $2_0$ to $2_{15}$ are connected to store and stuffing circuits $3_0$ to $3_{15}$, which they supply with shaped incoming information signals and rate signals, and the store and stuffing circuits are connected to sixteen inputs of a multiplexer 4. The outgoing 34 Mbits/s signal from multiplexer 4 is applied to an output junctor 5, which is connected to a wired or wireless digital transmission line 6.

The time base 7 supplies store and stuffing circuits $3_0$ to $3_{15}$ with orders CR controlling the read-out of the stores at the rate of 2.048 Mbits/s and stuffing permission orders SP. Time base 7 supplied multiplexer 4 with clock signals at the frequencies 2.048 and 34 Mbits/s, and supplies the output junctor 5 with clock signals at the frequencies 34 Mbits/s and 25 Mbits/s. To this end, the time base 7 usually comprises an oscillator at the frequency of 34 MHz, followed by frequency dividers dividing by 16 so as to obtain 2.048 MHz, by 24 so as to obtain the sector frequency and by 4 so as to obtain the frame frequency. The oscillator frequency is divided by 16 in the first frequency divider and multiplied by 12 so as to obtain the line frequency of 25 MHz.

On the receiver side at station B, the digital transmission line 6 is connected to an input junctor 15 connected to the input of a demultiplexer 14. The sixteen outputs of demultiplexer 14 are connected to store and unstuffing circuits $13_0$ to $13_{15}$, which are connected to output junctors $12_0$ to $12_{15}$ used for shaping, retiming and transcoding. Sixteen digital channels $11_0$ to $11_{15}$ operating at the rate of 2.048 Mbits/s extend from output junction $12_0$ to $12_{15}$.

A time base 17 is controlled by the 34 MHz rate signal obtained in the input junctor 15 from the recovered 25 MHz signal. Time base 17 supplies the store and unstuffing circuits with orders CW controlling write-in in the stores and stuffing identification orders SI. It supplies demultiplexer 14 with clock signals at the frequencies 34 and 2.048 MHz.

A second digital transmission line (not shown) analogous to the line 6 connects station B to station A. Station B comprises a transmitting device identical with that in station A, and station A comprises a receiving device identical with that in station B.

Figure 2:
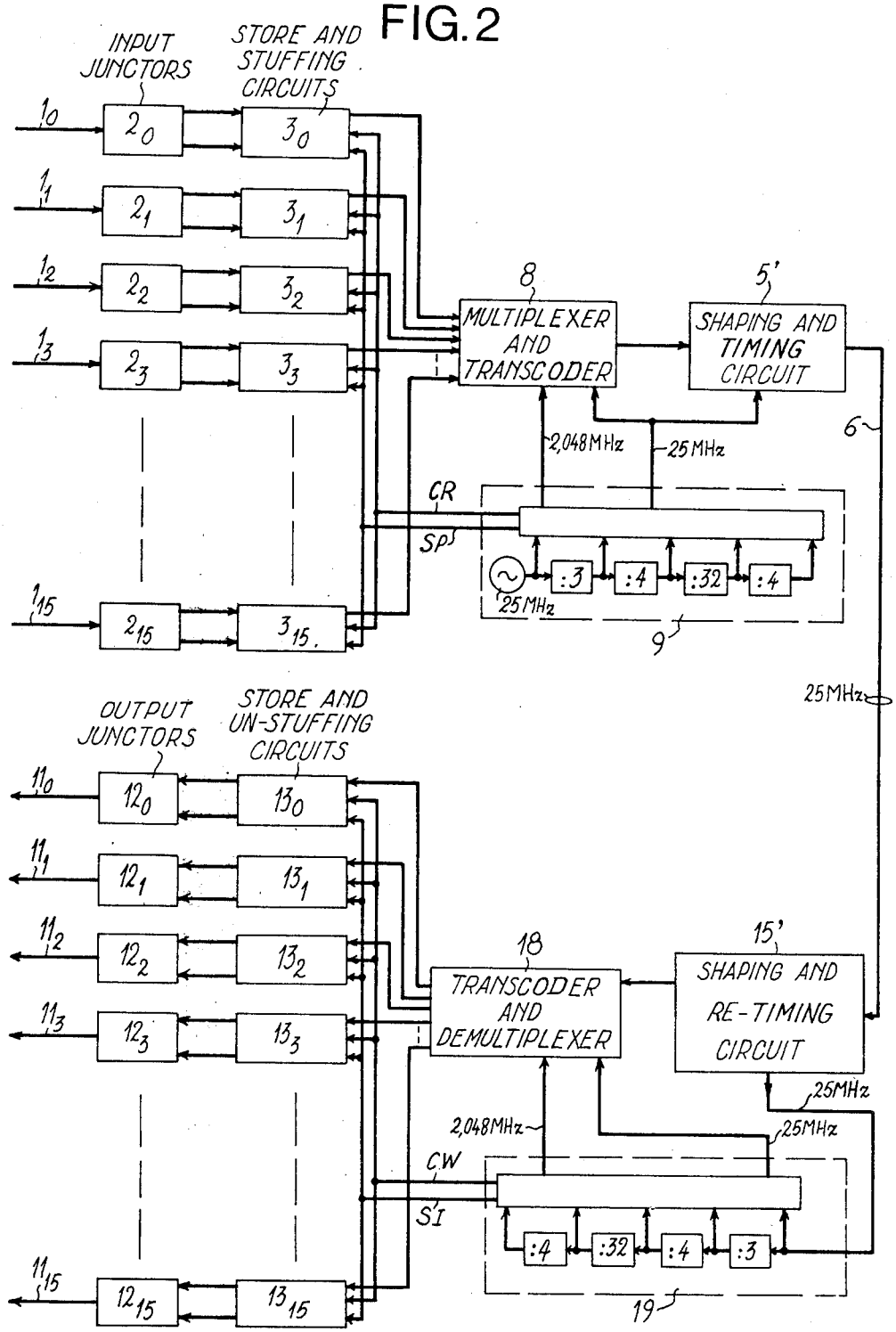
FIG. 2 is a block diagram of the electric circuit of a time-division digital transmission system embodying the invention.

Referring now to FIG. 2, numeral references $1_0$ to $1_{15}$, $2_0$ to $2_{15}$, $3_0$ to $3_{15}$ denote the same circuits as before, but multiplexer 4 and output junctor 5 are replaced by a single "multiplexertranscoder" 8 and a shaping and timing circuit 5', and the time base 7 is replaced by a different time base 9. Similarly, numeral references $11_0$ to $11_{15}$, $12_0$ to $12_{15}$, $13_0$ to $13_{15}$ denote the same circuits as before, but demultiplexer 14 and input junctor 15 are replaced by a single "transcoder and demultiplexer" 18 and a shaping and re-timing circuit 15', and the time base 17 is replaced by a different time base 19. In FIG. 2, the transmitting and receiving equipment does not contain a transmission line such as 10 or 20 (FIG. 1) conveying multiplex signals at the rate of 34 Mbits/s.

Figure 3A:
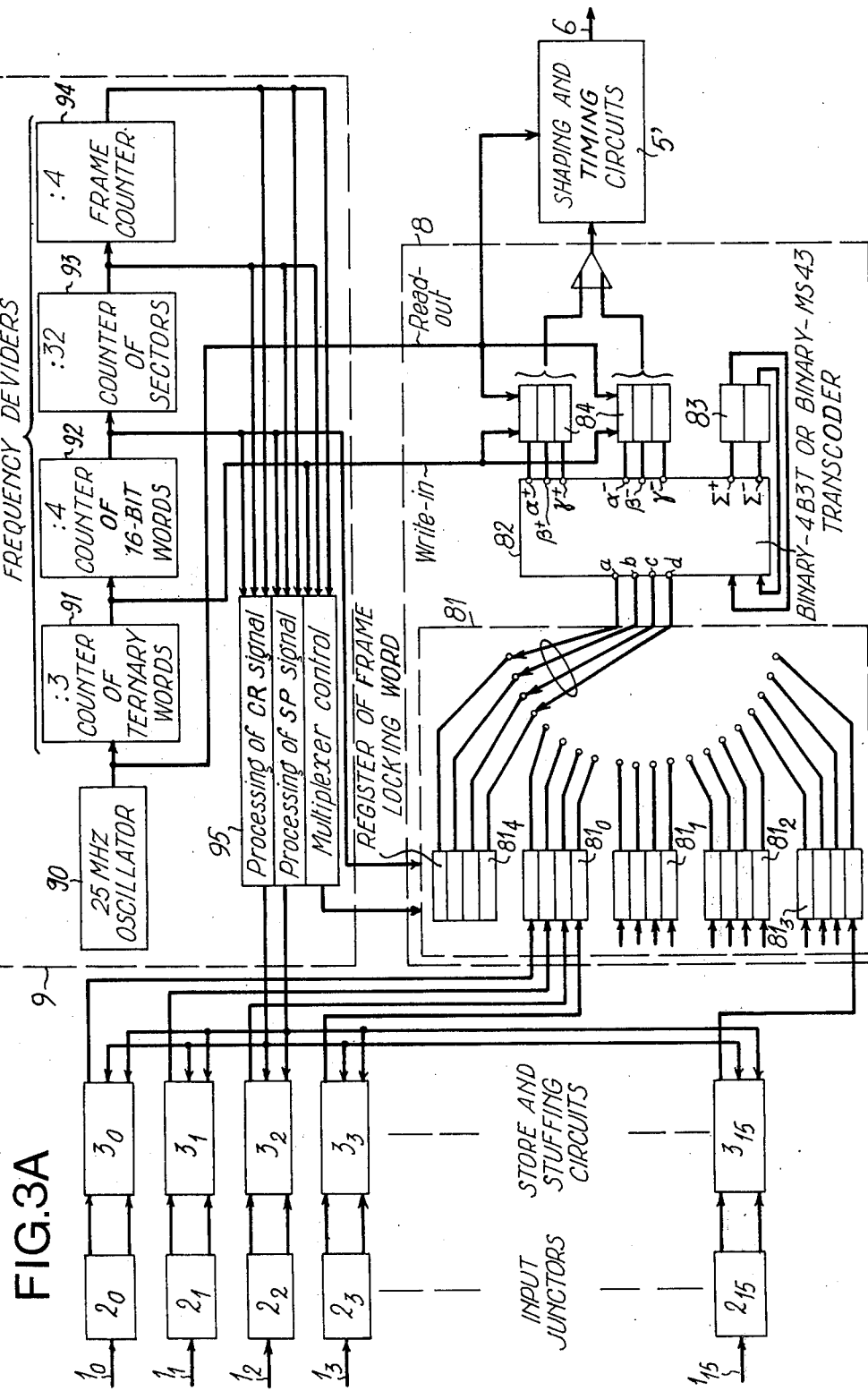
FIGS. 3A and 3B are circuit diagrams of the transmitting and receiving parts of a multiplexing-transcoding circuit and of a transcoding-demultiplexing circuit embodying the invention.

FIG. 3A shows the sixteen digital channels $1_0$ to $1_{15}$ incoming at the rate of 2.048 Mbits/s, the sixteen input junctors $2_0$ to $2_{15}$ and the sixteen store and stuffing circuits $3_0$ to $3_{15}$. The outputs of the store and stuffing circuits are connected in fours to registers $81_0$ to $81_3$. More specifically, the store and stuffing circuits $3_0$ and $3_3$ are connected to register $81_0$, the store and stuffing circuits $3_4$ to $3_7$ are connected to register $81_1$, the store and stuffing circuits $3_8$ to $3_{11}$ to register $81_2$ and the store and stuffing circuits $3_{12}$ to $3_{15}$ to register $81_3$. 16-bit words appear sequentially at the oututs of the four registers $81_0$ to $81_3$.

Instead of reading the 16-bit words bit by bit and serializing them as in the prior art, the bits of the 16-bit words are multiplexed into 4-bit parallel words in a multiplexer 81, and the 4-bit words are applied to a transcoder 82, for instance a binary code 4B3T-code transcoder. Transcoder 82 is a programmable store, e.g. of the SN 7486 kind, manufactured by Texas Instruments Inc.. In the programmable store, the two 4B3T code alphabets shown in the first table hereinbefore are written-in at the addresses formed by the 4-bit words to be transcoded. The input terminals of transcoder 82 are marked $a\ b\ c\ d$ and the output terminals are $\alpha^+, \beta^+, \gamma^+$ and $\alpha^-, \beta^-, \gamma^-$. The sign of the numerical cumulative disparity appears at terminals $\Sigma^+$ and $\Sigma^-$ and operates a trigger circuit 83, which selects a desired ternary alphabet. The ternary outputs of transcoder 82 are connected to the parallel-series converter 84, which is connected to the shaping and timing circuit 5'.

Multiplexer 81 comprises a fifth register $81_4$ which is read sequentially with the others, so as to provide the frame locking word.

The time base 9 comprises a 25 MHz oscillator 90 followed by a group of four frequency dividers 91, 92, 93 and 94 in serie. Frequency divider 91 divides by 3, divider 92 divides by 4, divider 93 divides by 32 and divider 94 divides by 4. The output of oscillator 90 gives the rate of the ternary digits in line code, the output of divider 91 gives the rate of the ternary words having three ternary digits, i.e. the rate of the 4-bit binary words, the output of divider 92 gives the rate of the 16-bit binary words, i.e. the inputting rate of 2.048 Mbits/s, the output of divider 93 gives the sector rate (384 bits per sector) and the output of divider 94 gives the frame rate (1536 bits per frame).

The output signals of frequency dividers 91–94 are applied to a control unit 95 which prepares signals CR controlling the read-out of the stores of the store and stuffing circuits $3_0$ to $3_{15}$, the stuffing permission signals SP, the read-out signals of registers $81_0$ to $81_3$ by parallel 4-bit words, the write-in and read-out signals of parallel-series converter 84, and the timing signals of the shaping and timing circuit 5'. The latter circuit differs from the output junctor 5 in that it does not comprise a code converter.

Figure 3B:
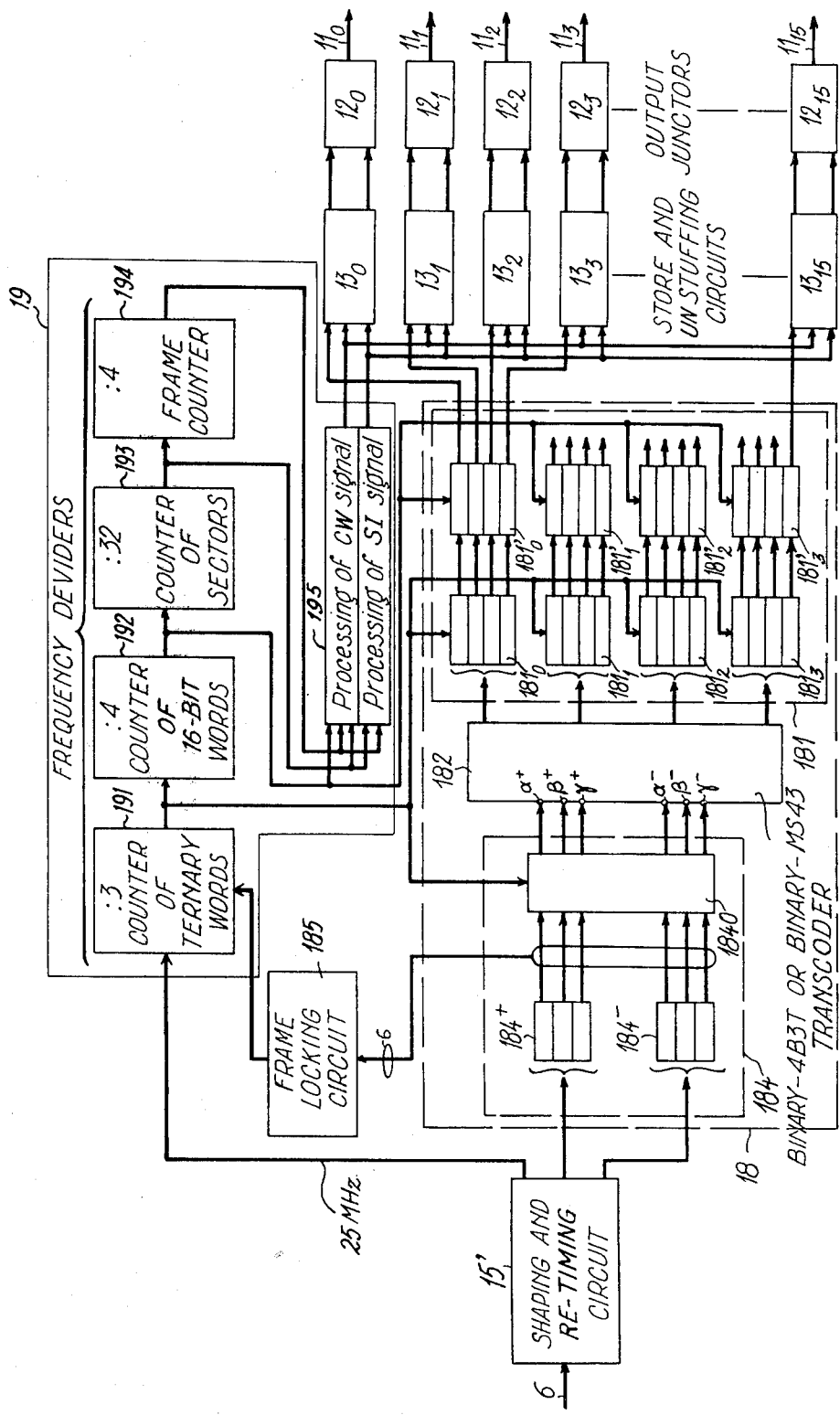

FIG. 3B shows a shaping and re-timing circuit 15' which differs from the input junctor 15 in that it does not comprise a code converter. Circuit 15' is connected to time base 19, which it supplies with the recovered rate signal. It is also connected to a series-parallel converter 184 made of registers 184+, 184− and 1840. Register 184+ receives the binary words $\alpha^+ \beta^+ \gamma^+$, register 184− receives the binary words $\alpha^- \beta^- \gamma^-$ and register 1840 receives the binary words $\alpha^+ \beta^+ \gamma^+ \alpha^- \beta^- \gamma^-$ corresponding to the ternary word $\alpha \beta \gamma$. Register 1840 is connected to a transcoder 182, for instance a code 4B3T binary code transcoder. Transcoder 182, like transcoder 82, is a programmable store, e.g. of the SN 7486 type, containing four-bit words $a\ b\ c\ d$ at the addresses $\alpha^+ \beta^+ \gamma^+ \alpha^- \beta^- \gamma^-$.

The $a\ b\ c\ d$ output of transcoder 182 is connected to the series inputs of four registers $181_0$ to $181_3$, the parallel outputs of which are connected to other registers $181'_0$ to $181'_3$. The sixteen outputs of registers $181'_0$ to $181'_3$ are respectively connected to the store and unstuffing circuits $13_0$ to $13_{15}$. Output junctors $12_0$ to $12_{15}$ connected to the outgoing channels $11_0$ to $11_{15}$ at 2.048 Mbits/s are disposed behind circuits $13_0$ to $13_{15}$.

The shaping and re-timing circuit 15' is connected to time base 19. The time base comprises a group of four frequency dividers 191, 192, 193 and 194 in serie. Divider 191 divides by 3, divider 192 divides by 4, divider 193 divides by 32 and divider 194 divides by 4, the group of frequency divider 191 to 194 being similar to group 90–94. The time base 19 does not comprise a voltage-controlled oscillator.

The outputs of registers 184+ and 184− are connected to a frame-locking circuit 185 which can lock the frequency divider group 191 to 194, i.e. the first frequency divider 191, in wellknown manner.

The output signals from frequency dividers 191–194 are applied to a control unit 195 which prepares signals CW controlling the write-in of the stores of the store and unstuffing circuits $13_0$ to $13_{15}$, the stuffing identification signals SI, the read-out signals of register 1840 via parallel words having 6 ternary digits (including three zeros) and the write-in signals of registers $181_0$ to $181_3$ and $181'_0$ to $181'_3$.

Hitherto, it has been assumed that the transcoder converts binary elements into ternary elements or, more specifically, binary words having N bits equal to 4 into ternary words having N' ternary digits equal to 3. More generally, codes are known in which an alphabet made up of $2^N$ binary N-bit words is converted into an alphabet made of $P^{N'}$ words of N' digits at P levels. For example, in code 3B–2Q, we have:

$$N = 3\ 2^N = 8\ P = 4\ N' = 2\ P^{N'} = 16$$

and the gain in flow rate is $(N-N')/N = 33\%$.

In code 5B–2Q, we have:

$$N = 5\ 2^N = 32\ P = 8\ N' = 2\ P^{N'} = 64$$

and the gain in flow rate is $(N-N')/N = 60\%$.

What we claim is:

1. A time-division digital transmission system comprising transmitting and recieving stations and transmission lines interconnecting said respective stations using a binary code in said stations and a multi-level code in said transmission lines in which a number of component digital channels having a low flow rate are multiplexed into a single resultant channel having a high flow rate, said multi-level code being such that a number N of bits in said binary code in the transmitting and receiving stations corresponds to a smaller number N' of digits of the multi-level code whereby a predetermined flow rate in said stations corresponds to a smaller flow rate in said transmission lines which is equal to N'/N times said predetermined flow rate in said stations, said time-division digital transmission system comprising:

1. each of said transmitting stations having:
   a. means for placing in parallel the bits of a number of said component digital channels equal to an integral multiple k of N at the rate of one bit per component digital channel so as to form parallel words of kN bits;
   b. means for multiplexing the bits of said parallel kN-bit words into k parallel words of N bits;
   c. means for converting said parallel N-bit words from said binary code used in said stations into parallel words of N' digits in said multi-level code used in said transmission lines; and
   d. the multiplexing and code conversion being practically simultaneous without producing a binary multiplex signal which is serialized; and
2. each of said receiving stations having:
   a. means for distributing the bits of said parallel words of kN bits at the rate of one bit on each of the kN component digital channels;
   b. means for converting said parallel N'-digital words into parallel N-bit words of said binary code used in said stations;
   c. means for forming parallel words of kN bits out of the number of k of N-bit words supplied by converting means in said receiving part; and
   d. means for multiplexing said parallel kN-bit words into kN bits at the rate of one bit per component digital channel.

2. A time-division digital transmission system according to claim 1, in which $N = 4$ and in which said multi-level code has three levels and $N' = 3$.

3. A time-division digital transmission system according to claim 1, in which $k = 4$.

4. A time-division digital transmission system according to claim 1, in which said multi-level code used on said transmission lines is the three-level 4B3T code.

5. A time-division digital transmission system according to claim 1, in which said multi-level code used on said transmission lines is the three-level MS43 code.

6. A time-division digital transmission system according to claim 1, in which $N = 3$, and in which said multi-level code has four levels and $N' = 2$.

7. A time-division digital transmission system according to claim 1, in which $N = 5$, and in which said multi-level code has eight levels and $N' = 2$.

* * * * *